United States Patent [19]
Okada et al.

[11] Patent Number: 5,513,113
[45] Date of Patent: Apr. 30, 1996

[54] METHOD OF AND DEVICE FOR CORRECTING POSITION OF CUTTING-EDGE OF TOOL IN NUMERICALLY CONTROLLED MACHINE TOOL

[75] Inventors: Yasuaki Okada, Kagamihara; Shinji Yoshikawa, Inuyama; Eishiro Urano, Yokohama, all of Japan

[73] Assignees: Murata Kikai Kabushiki Kaishi, Kyoto; Nissan Motor Co., Ltd., Yokohama, both of Japan

[21] Appl. No.: 359,900

[22] Filed: Dec. 20, 1994

[30] Foreign Application Priority Data

Dec. 27, 1993 [JP] Japan ................................ 5-346949

[51] Int. Cl.⁶ ............................................ G05B 19/404
[52] U.S. Cl. .......................... 364/474.21; 364/474.17; 364/474.35; 483/11
[58] Field of Search .................. 364/474.21, 474.35, 364/474.16, 474.17, 474.19; 483/4, 5, 7, 10, 11

[56] References Cited

U.S. PATENT DOCUMENTS

| | | | |
|---|---|---|---|
| 3,576,540 | 4/1971 | Fair et al. ........................... | 364/474.21 |
| 4,502,108 | 2/1985 | Nozawa et al. ..................... | 364/474.35 |
| 4,887,221 | 12/1989 | Davis et al. ..................... | 364/474.21 X |
| 4,942,611 | 7/1990 | Kunugi et al. ................. | 364/474.35 X |

*Primary Examiner*—Joseph Ruggiero
*Attorney, Agent, or Firm*—Foley & Lardner

[57] ABSTRACT

A method of and device for correcting a cutting-edge position of a tool installed in a numerically controlled machine. The device includes a CPU which operates a basic processing program, taking a cutting-edge position correction value thereinto, a judging unit for judging whether a temperature of the main spindle table is in a normal condition or an abnormal condition when exchanging the old tool for the new tool, a normal position correcting unit for detecting a movement amount of tool table necessary to bring the cutting-edge of the new tool into contact with a cutting-edge detecting sensor, an abnormal position correcting unit for detecting the movement amount of tool table necessary to bring the cutting-edge of the old tool into contact with the cutting-edge detecting sensor, and cutting ability adjusting unit for memorizing a dimensional change of the work machined as the cutting ability correction value of the tool in the abnormal condition. The normal and abnormal position correcting units memorize a difference between the movement amount including the cutting-edge position correction value on memory at that time and the predetermined standard dimension, as the normal and abnormal cutting-edge position correction value for the new tool, respectively.

5 Claims, 7 Drawing Sheets

FIG. 7

| RULE NO. | DEVIATION FROM MID-POINT OF TOLERANCE | FREQUENCY OF OCCURRENCE | COMPENSATING AMOUNT $\alpha$ | CORRECTION VALUE $\Delta S$ |
|---|---|---|---|---|
| 1 | WITHIN $5\mu$ | — | 0 | $\Delta S$ |
| 2 | $5\mu <$ | 3 TIMES IN SERIES | $3\mu$ | $\Delta S + 3\mu$ |
| 3 | $5\mu <$ | 8 TIMES IN SERIES | $7\mu$ | $\Delta S + 7\mu$ |

METHOD OF AND DEVICE FOR CORRECTING POSITION OF CUTTING-EDGE OF TOOL IN NUMERICALLY CONTROLLED MACHINE TOOL

BACKGROUND OF THE INVENTION

The present invention relates to a method of correcting a position of a cutting-edge of a tool of a numerically controlled machine tool and a device for correcting the position thereof.

A conventional NC machine tool is disclosed, for example, in Japanese Patent Laid Open No. 60-146653. There is shown a numerically controlled lathe as a similler numerically controlled machine tool in FIG. 1. In the figure, reference numeral 100 designates the numerically controlled (NC) lathe which is mainly constituted by a main spindle table 101 and a tool table 200 movably mounted on a bed opposite to the table 101 in respective directions of arrows X and Z. The main spindle table 101 supports a rotatable main spindle 102 driven by a not-shown driving unit. Attached on the leading end of the main spindle 102 is a chucking unit 103 which serves to grasp a work W to be processed by the numerically controlled lathe 100. The main spindle table 101 further includes an arm 104 projecting laterally. The arm 104 is provided at the leading end thereof with a sensor S for detecting a position of a cutting edge of a tool.

The tool table 200 is supported on a not-shown table which is movable in the direction of Z, so as to move in the direction of X by the aid of a ball screw 201 which is mounted on the not-shown table to extend in the direction of X. On a side wall of the tool table 200, a turret 202 is provided with a tool holder 203 equipped with a tool T for machining the work W.

In operation of the so-constructed NC lathe 100, when the main spindle 102 is rotated by the driving unit, the work W grasped by the chucking unit 103 is rotated at a predetermined speed and then, the work W is machined by the tool T mounted on the tool table 200 moving to the directions of Z and X. In case of applying a desired processing on the work W by the NC lathe 100, the processing is carried out on a basis of a numerical control (NC) processing program installed in a numerical control (NC) unit 300 arranged in the vicinity of the NC lathe 100.

Referring to FIG. 2, there is shown a central processing unit (CPU) 301 of the NC unit 300, to which a keyboard 302 for inputting necessary data and a CRT 303 as a display unit for displaying the data, tables, figures or the like are connected. Further connected to the CPU 301 are a means 304 for correcting a position of tool and a memory section 305 in which a basic processing program is installed for producing the NC processing program in a fixed cycle. During machining, in case of correcting a position of the cutting-edge by reason of the exchange of tool attached, the wear of the cutting edge or the like, the correction is carried out by the correcting means 304 which adjusts a distance L0 (FIG. 1) between an axis of the main spindle 102 and the position of cutting edge of the tool on the basic processing program.

In such a case, this correcting means 304 operates so that a constant machining dimension is always attained for the work, correcting the changes in position of cutting edge of the tool caused by the exchange of tool attached, the wear of the cutting edge or the like. In detail, the means 304 memorizes the difference between a displacement L2 shown in FIG. 1 and a predetermined standard dimension, as correction values and then executes to correct the position of the cutting edge on the basic processing program. Note, the displacement L2 corresponds to a movement amount of the tool table 200 necessary to bring the cutting-edge of the tool T into contact with the sensor S, which of course, contains a cutting-edge position correction value on memory of the means 304 at that time. The distance between the axis of the main spindle 102 and the cutting-edge of the tool T is equal to a value obtained by adding a distance L1 between the axis of the main spindle 102 and the sensor S to the displacement L2 of the tool table 200.

In this way, in the conventional NC lathe 100, a standard dimension to be determined in correcting the position of tool is a fixed constant value. Therefore, when the change in distance L1 is caused by the "thermal" displacement of the sensor S attributed to the changes in environmental temperature, heat generated from the machine itself, cutting heat or the like, this change $\Delta L1$ results in an error in measuring the displacement L2 of the tool table 200. Consequently, the error causes a correction error in position of the cutting-edge, so that it is impossible to process the work with appropriate dimensions.

SUMMARY OF THE INVENTION

It is therefore the object of the present invention to provide a method of correcting a position of a cutting edge of a tool of a numerically controlled machine tool and to provide a device for correcting thereof, by which it is possible to obtain an appropriate correction with respect to the position of cutting edge in spite of the "thermal" displacement of a cutting-edge detecting sensor, whereby an appropriate dimension can be accomplished for the work machined.

One object of the invention described above can be accomplished by a method of correcting a cutting-edge position of a tool installed in a numerically controlled machine having a bed, a main spindle table fixed on the bed, a main spindle rotatably supported by the main spindle table for carrying a work to be machined, a tool table movably mounted on the bed, a tool for machining the work and a cutting-edge detecting sensor mounted on either the main spindle table or the bed for detecting a cutting-edge position of the tool, said numerically controlled machine tool being operated in accordance with a basic processing program into which a difference between a movement amount of the tool table and a predetermined standard dimension is provided as a cutting-edge position correction value, the movement amount of the tool table being a distance necessary to bring the cutting-edge of the tool into contact with the cutting-edge detecting sensor, the method comprising the steps of:

judging whether a temperature of the main spindle table is in a normal condition or an abnormal condition when exchanging the old tool for the new tool;

in the normal condition,
  regarding the movement amount of the tool table as the normal movement amount of the tool table having the new tool;
  providing a difference between the normal movement amount and the predetermined standard dimension into the basic processing program, as the cutting-edge position correction value for the new tool; or
in the abnormal condition,
  regarding the movement amount of the tool table as the abnormal movement amount of the tool table having the old tool;

replacing the predetermined standard dimension with the abnormal movement amount as the newly determined standard dimension;

establishing a difference between the newly determined standard dimension and a position of the cutting-edge of the new tool as the cutting-edge position correction value for the new tool;

regarding a machined dimensional change, which can be obtained from a relationship thereof with wear amount of cutting-edge by preceding experiments, as the cutting ability correction value of the tool; and providing the cutting-edge position correction value for the new tool and the cutting ability correction value thereof into the basic processing program.

In the above-mentioned method, judging whether the main spindle table at the time of exchanging the tool is in the normal condition or not, the cutting-edge position of the tool is corrected by using different standard dimensions which are prepared for the normal and abnormal conditions, respectively. Then, in the normal condition, a predetermined constant is used as the normal standard dimension. In the abnormal condition, assuming that the tool on use performs a machining with proper dimensions, there is employed as the abnormal standard dimension, a movement amount of the tool table necessary to bring the cutting-edge of the old tool into contact with the cutting-edge detecting sensor, including the cutting-edge position correction value on memory at that time. In this way, in the abnormal condition where the cutting-edge detecting sensor is displaced thermally, since the thermally displaced sensor detects the movement amount of the tool table, into which the cutting-edge position correction value on memory at that time is also combined, it is possible to eliminate measuring errors derived from the thermal displacement of the cutting-edge detecting sensor. In addition, since such a cutting-edge position correction is completed taking the cutting ability correction value concerning the change in cutting ability derived from the wear of cutting-edge into the basic processing program, it is possible to perform the machining with proper dimensions usually, eliminating an influence derived from a difference in cutting ability between the old tool and the new tool.

In the present invention, preferably, the judgement whether the temperature of the main spindle table is in the normal condition or the abnormal condition is attained by judging whether a rest period of the machine is in excess of a predetermined time or not. When the rest period is so short as to be within the predetermined time, it is judged that the main spindle table is in the abnormal condition since it is not cooled down sufficiently. On the contrary, when the rest period is so long as to be in excess of the predetermined time, it is judged that the main spindle table is in the normal condition since the it is cooled down sufficiently.

In the present invention, preferably, during operation of the machine tool, the cutting ability correction value is always corrected by a feed back control carried out by monitoring either a dimension of the work on machining or a cutting force exerted on the tool. Consequently, in the case that the kind of work changes or that the wear amount of the cutting-edge is not a constant, it is possible to provide the appropriate dimension for the work on machining at all times.

The other object of the invention described above can be accomplished by a device for correcting a position of cutting-edge of a tool installed in a numerically controlled machine having a bed, a main spindle table fixed on the bed, a main spindle rotatably supported by the main spindle table for carrying a work to be machined, a tool table movably mounted on the bed, a tool for machining the work and a cutting-edge detecting sensor mounted on either the main spindle table or the bed for detecting a cutting-edge position of the tool, said numerically controlled machine tool being operated in accordance with a basic processing program into which a difference between a movement amount of the tool table and a predetermined standard dimension, is provided as a cutting-edge position correction value, the movement amount of the tool table being at a distance necessary to bring the cutting-edge of the tool into contact with the cutting-edge detecting sensor, the device comprising:

a central processing unit which operates the basic processing program, taking the cutting-edge position correction value thereinto;

judging means for judging whether a temperature of the main spindle table is in a normal condition or an abnormal condition when exchanging the old tool for the new tool;

normal position correcting means for detecting the movement amount of the tool table necessary to bring the cutting-edge of the new tool into contact with the cutting-edge detecting sensor, the normal position correcting means memorizing a difference between the movement amount of the tool table and the predetermined standard dimension as the normal cutting-edge position correction value for the new tool;

abnormal position correcting means for detecting the movement amount of the tool table necessary to bring the cutting-edge of the old tool into contact with the cutting-edge detecting sensor, the abnormal position correcting means memorizing the difference between the movement amount of the tool table and the predetermined standard dimension as the abnormal cutting-edge position correction value for the old tool; and cutting ability adjusting means for memorizing a dimensional change of the work machined as the cutting ability correction value of the tool in the abnormal condition, the dimensional change being obtained from a relationship thereof with wear amount of cutting-edge by preceding experiments. With the arrangement mentioned above, effects similar to the effects described above can be obtained.

Also in the above device of the present invention, preferably, the judging means judges whether the rest period of the machine in case of exchanging the tool is within a predetermined time or not. Therefore, when the rest period is so short as to be within the predetermined time, the judging means Judges that the main spindle table is in the abnormal condition since it is not cooled down sufficiently. On the contrary, when the rest period is so long as to be in excess of the predetermined time, the means judges that the main spindle table is in the normal condition since it is cooled down sufficiently.

Other objects and features of the present invention will become more fully apparent from the following description and appended claims taken in conjunction with the accompanying drawings.

BRIEF DESCRIPTION OF THE DRAWING

FIG. 7 is a table showing a rule for determining some correction values in response to the deviation of FIG. 6;

FIG. 8 is a graphic chart showing a change of cutting force in case of cutting the final work by the old tool at the end of tool's life;

DESCRIPTION OF THE PREFERRED EMBODIMENT

An embodiment of the present invention is now described with reference to the drawings.

Figure 1:
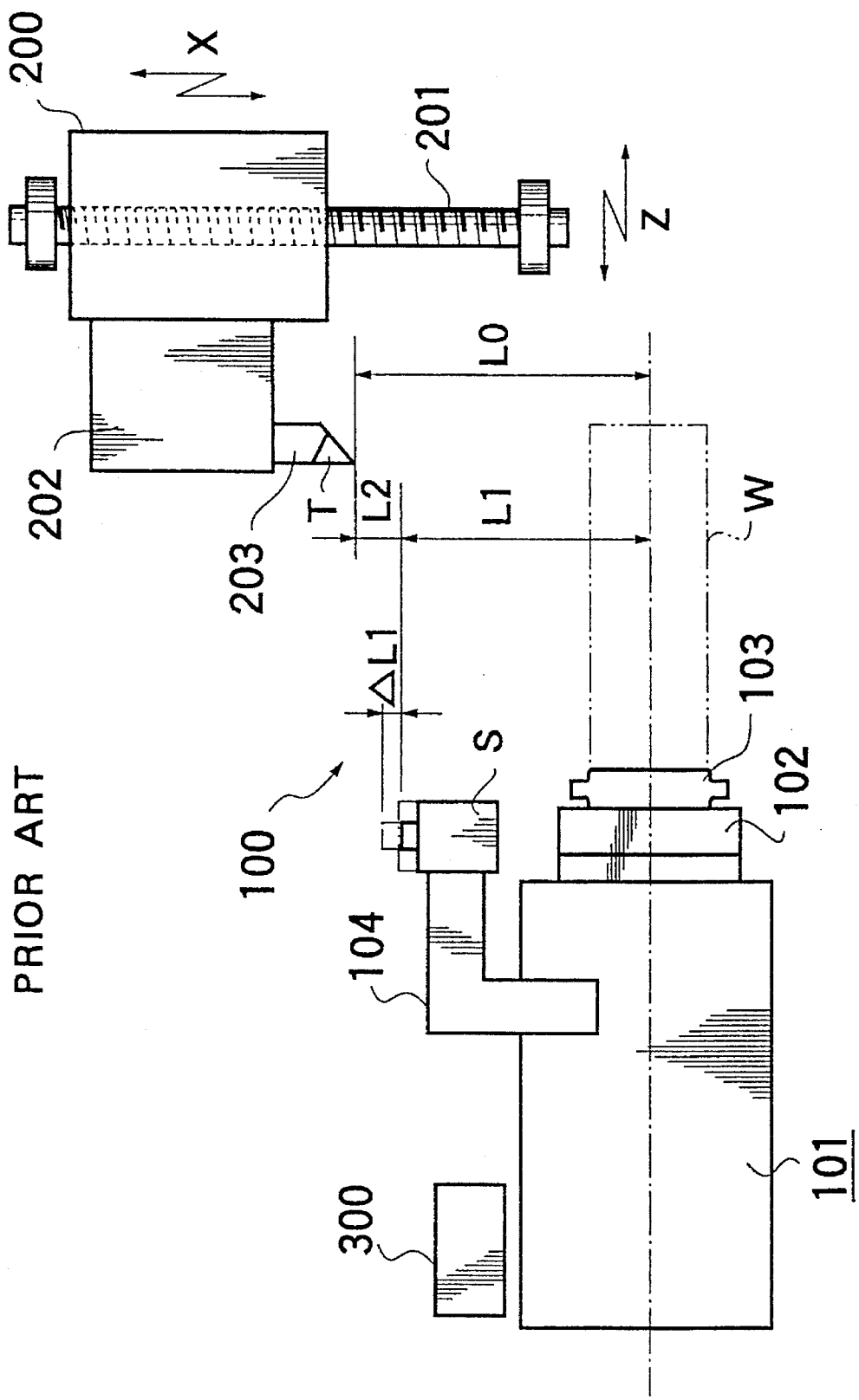
FIG. 1 is an explanatory diagram of a method of correcting a position of a cutting edge of tool, showing a conventional numerically controlled machine tool.
Figure 2:
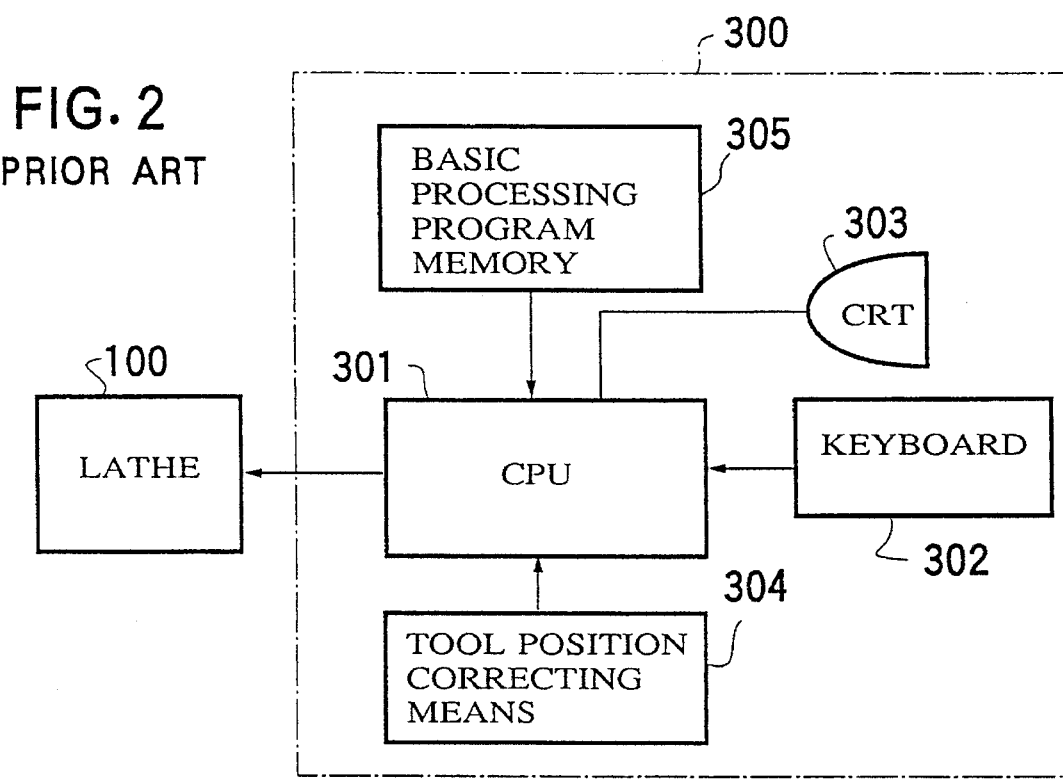
FIG. 2 is a block diagram showing a construction of the conventional numerically controlled machine.
Figure 3:
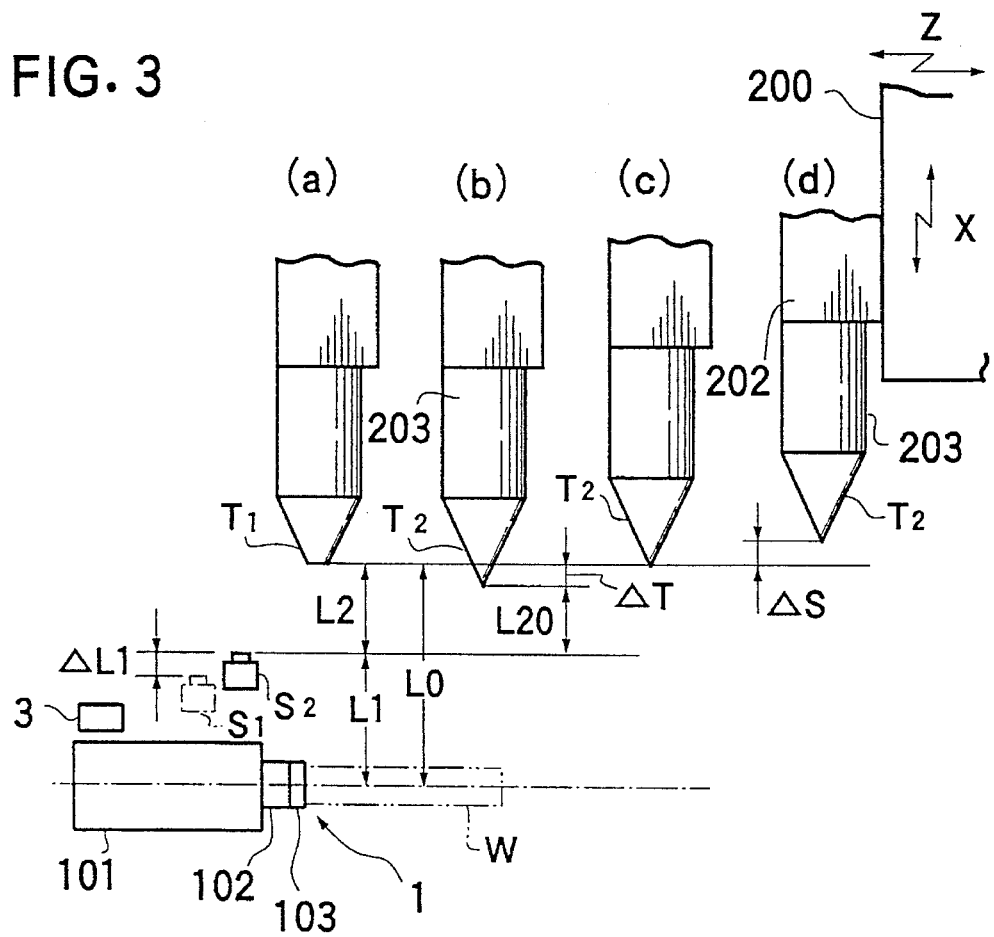
FIG. 3 is an explanatory diagram of a method of correcting a position of a cutting edge of tool, showing a numerically controlled machine tool in accordance with an embodiment of the present invention.

Similarly to FIG. 1, a numerically controlled (NC) lathe 1 of the embodiment shown in FIG. 3 consists of a main spindle table 101, a sensor S1(S2) for detecting the position of a cutting-edge of tool, a tool T1 (or T2) carried by a tool holder 203 and a NC unit 3. The mutual relationship between these constituents is similar to that of the afore-mentioned conventional NC lathe 100 (see FIG. 1). Therefore, in the NC lathe 1, elements similar to those of the conventional NC lathe 100 are indicated with the same reference numerals, respectively.

That is, the main spindle table 101 is fixed on a bed which is not shown in the figure. Rotatably supported by the main spindle table 101 is a main spindle 102 which is driven by a not-shown driving unit and which includes a chucking unit 103 for grasping a work W to be processed by the NC lathe 1. The tool T2( or T1) is arranged so as to move to the directions Z and X since, through the intermediary of the turret 202, the tool holder 203 carrying the tool is attached to the tool table 200 movably supported on the bed in the same directions (see FIG. 1). Note that, in FIG. 3, a letter T1 designates an old tool before exchange which is on the end of its life and the other letters T2 designate respective new tools after exchange.

A sensor S2 (S1), which will be also referred to as "cutting-edge detecting sensor" hereinafter, is arranged to project to the lateral side of the main spindle table 101 by an arm (not shown). Regarding the cutting-edge detecting sensor shown in FIG. 3, a letter S1 designates the cutting-edge detecting in case that the equipment, i.e., the NC lathe 1 is in a normal condition. On the contrary, a letter S2 designates the cutting-edge detecting sensor in case that the NC lathe 100 is not in the normal condition, namely an abnormal condition. In another arrangement, the cutting-edge detecting sensor S2(S1) may be mounted on the bed directly.

In operation, which is similar to those of the conventional NC lathe, when the main spindle 102 is rotated by the driving unit, the work W is rotated at a predetermined speed and machined for the desired configuration by the tool T2(T1) which moves in the directions of Z and X. Note, in this lathe 1, the machining is conducted in accordance with a basic processing program stored in a numerical control (NC) unit 3 in the vicinity of the NC lathe 1.

Figure 4:
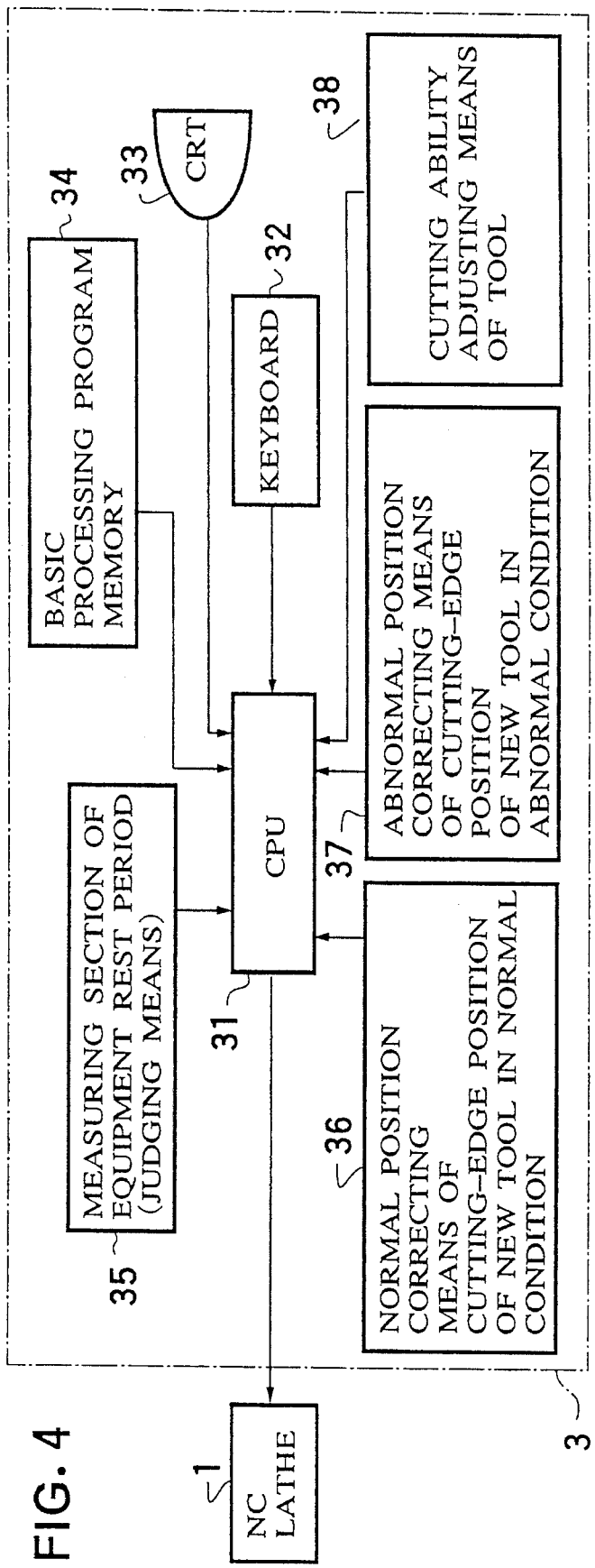
FIG. 4 is a block diagram showing a construction of the numerically controlled machine in accordance with the embodiment of the present invention.

Referring to FIG. 4, the NC unit 3 includes a central processing unit (CPU) 31, a keyboard 32 for inputting various data necessary for the machining to the CPU 31 and a CRT 33 as a display unit for displaying the input data, tables, figures or the like. Furthermore, the NC unit 3 has a basic processing program memory 34 for memorizing the basic processing program therein, a measuring section 35 for detecting a rest period of the lathe 1, a normal position correcting means 36 for correcting the position of the cutting-edge (tool nose) of the new tool in the normal condition, an abnormal position correcting means 37 for correcting the position of the cutting-edge of the new tool in the abnormal condition and a cutting ability adjusting means 38 for adjusting the cutting ability of the tool, all of which are connected to the CPU31.

The basic processing program stored in the memory section 34 is built up as a problem to be executed in a fixed cycle. On the basic processing program, the correction of the cutting-edge position of the tool is directed to adjustment of distance between the axis of the main spindle 102 and the cutting-edge of the tool, as shown in FIG. 3.

In operation, the measuring section 35 detects the rest period of the main spindle table 101 during the exchange of the old tool for the new tool. If the detected rest period is in excess of a predetermined value, the section 35 judges that the NC lathe 1 is now in the normal state, since the main spindle table 101 is cooled down sufficiently. On the contrary, if the detected rest period is within the predetermined value, the section 35 judges that the NC lathe 1 is in the abnormal state, since the main spindle table 101 is heated by reasons of environmental influence, heated equipment, cutting-heat or the like. It is presumed that, in this abnormal condition, the cutting-edge detecting sensor S2 is apart from the axis of the main spindle 102 by a distance L1. That is, the cutting-edge detecting sensor S2 in the abnormal condition is "thermally" deviated from the cutting-edge detecting sensor S1 in the normal condition by a distance $\Delta L1$.

Using a predetermined standard dimension as a constant, the normal position correcting means 36 memorizes the difference between the predetermined standard dimension and the movement amount of the tool table 200 necessary to bring the cutting-edge of the new tool into contact with the cutting-edge detecting sensor S1, as the normal position correction value. Note, regarding a decision of the movement amount of the tool table 200, a cutting-edge position correction value that the means 36 has been memorizing at that time is also taken into consideration.

On the other hand, the abnormal position correcting means 37 measures a movement amount of the tool table 200, to which a cutting-edge position correction value memorized in the means 37 at that time is also taken into consideration, necessary to bring the cutting-edge of the old tool T1 into contact with the cutting-edge detecting sensor S2 as the abnormal standard dimension L2. Sequentially, the means 37 further measures another movement amount L20 of the tool table 200 necessary to bring the cutting edge of the new tool T2 into contact with the cutting-edge detecting sensor S2 and then calculates and memorizes a difference $\Delta T$ between the abnormal standard dimension L2 and the movement amount L20, as the abnormal position correction value.

The cutting ability adjusting means 38 memorizes dimensional changes of the machined work, which can be obtained from a relationship between various wear amounts of the cutting-edge and the dimensional changes, as the "cutting ability" correction value ΔS. Note, this relationship can be obtained by the preceding experiments. The cutting ability correction value ΔS is provided since there is a remarkable difference between the cutting ability of the new tool T2 and that of the old tool T1 and therefore, the value ΔS can be obtained as follows.

Figure 5:
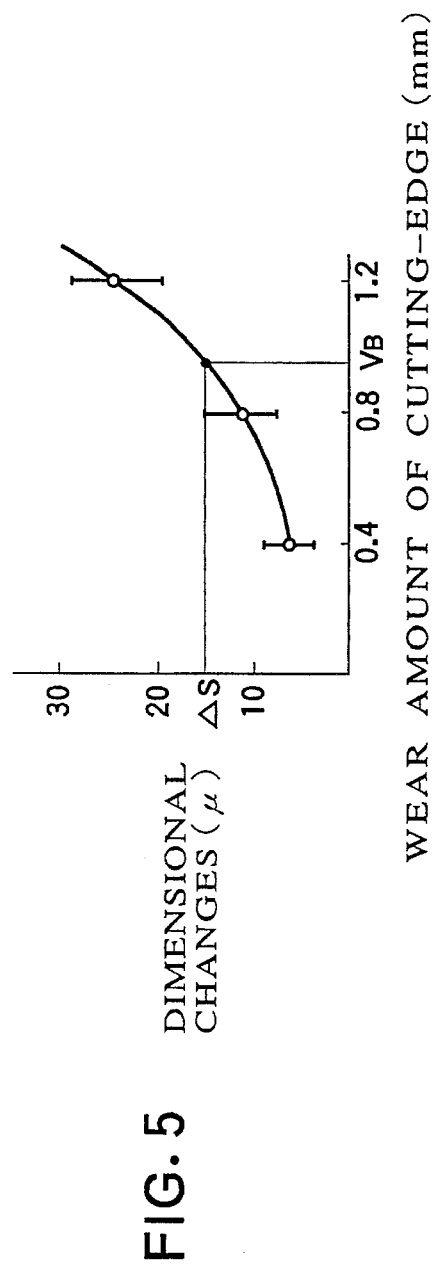
FIG. 5 is a diagram showing a relationship between the wear amount of the cutting edge and the dimensional change in the work.

In case of mass-producing a single kind of works by the equipment, the relationship between the wear amount of the cutting-edge and the dimensional change of the machined work as shown in FIG. 5, can be obtained by the preceding experiments using the lathe and the tool, which are identical to those employed for such a mass-production, respectively. That is, the experiments are carried out by detecting various wear amount VB of the tools after use and sequent calculating an average of a variety of dimensional changes of the works machined corresponding to the respective tools: the calculated average is then established as the cutting ability correction value ΔS. Next, upon memorizing the value ΔS as a constant into the means 38, the value will be taken into the basic processing program loaded from the memory 34 when correcting the position of cutting-edge of the new tool T2 after exchange.

On the other hand, in either case of changing the kind of work to another or the case that the wear amount of cutting-edge is not a constant value, the cutting ability correction value ΔS can be determined by two following methods and the position of cutting-edge is always compensated during operation of the equipment.

Figure 6:
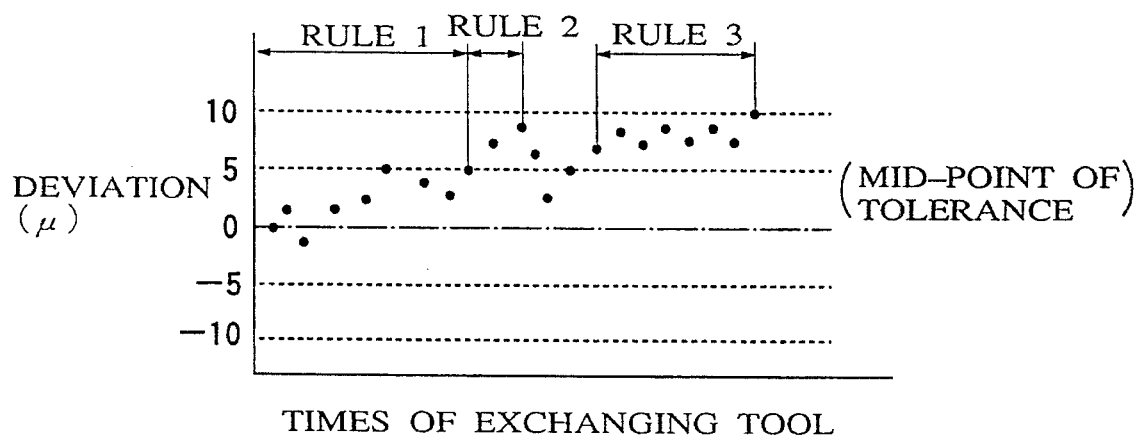
FIG. 6 is a graphic chart showing a deviation model from a mid-point of tolerance.

According to the first method, a so-called "tendency variation" feed back control is carried out by monitoring a dimension of the machined work. That is, on the condition that the dimension of the initially machined work after exchange of the tool is memorized at every exchange, a "tendency variation" correction value ΔS and a compensating amount α are determined in accordance with predetermined rules, which will be described later, in order to detect a deviation from a dimension of design such as a mid-point of tolerance. For example, in case of the tendency variation as shown in FIG. 6, the rules would be predetermined as shown in a table of FIG. 7.

In this regards, the case of Rule No. 1 corresponds to a case in which the deviation from the mid-point of tolerance is within 5μ, so that the conditions of α=0 and ΔS=ΔS are established. Again, the case of Rule No. 2 corresponds to the case where the deviation from the mid-point of tolerance is in excess of 5μ and such a deviation is caused by three times in series. In this case, the conditions of α=3μ and ΔS=ΔS+S+3μ are established. The case of Rule No. 3 corresponds to a case where the deviation from the mid-point of tolerance is in excess of 5μ and such a deviation is caused by eight times in series. In this case, the conditions are established so as to be α=7μ and ΔS=ΔS+7μ.

According to the second method, by monitoring cutting force, such a "tendency variation" feed back control is carried out. For example, by arranging a cutting force detecting means, such as a strain gauge attached on the tool holder, the cutting force onto the work finally processed by the tool at the end of life is detected prior to every exchange of the tool. And then, a "tendency variation" correction value ΔS and a compensating amount α are determined in accordance with predetermined rules in order to detect the cutting force.

For example, in case of the tendency variation as shown in FIG. 8, an upper control limit F1 and a lower control limit F2 would be previously established on the upper and lower sides side of standard value F0, respectively. Under such a condition, if the detected cutting force is out of a range between the control limits F1 and F2 by predetermined times, a tendency variation correction value ΔS and a compensating amount α would be determined in accordance with Rules as similar to the rule of FIG. 7. In the case of FIG. 8, it will be understood that a section shown with a letter "A" corresponds to an area to be corrected.

Figure 9:
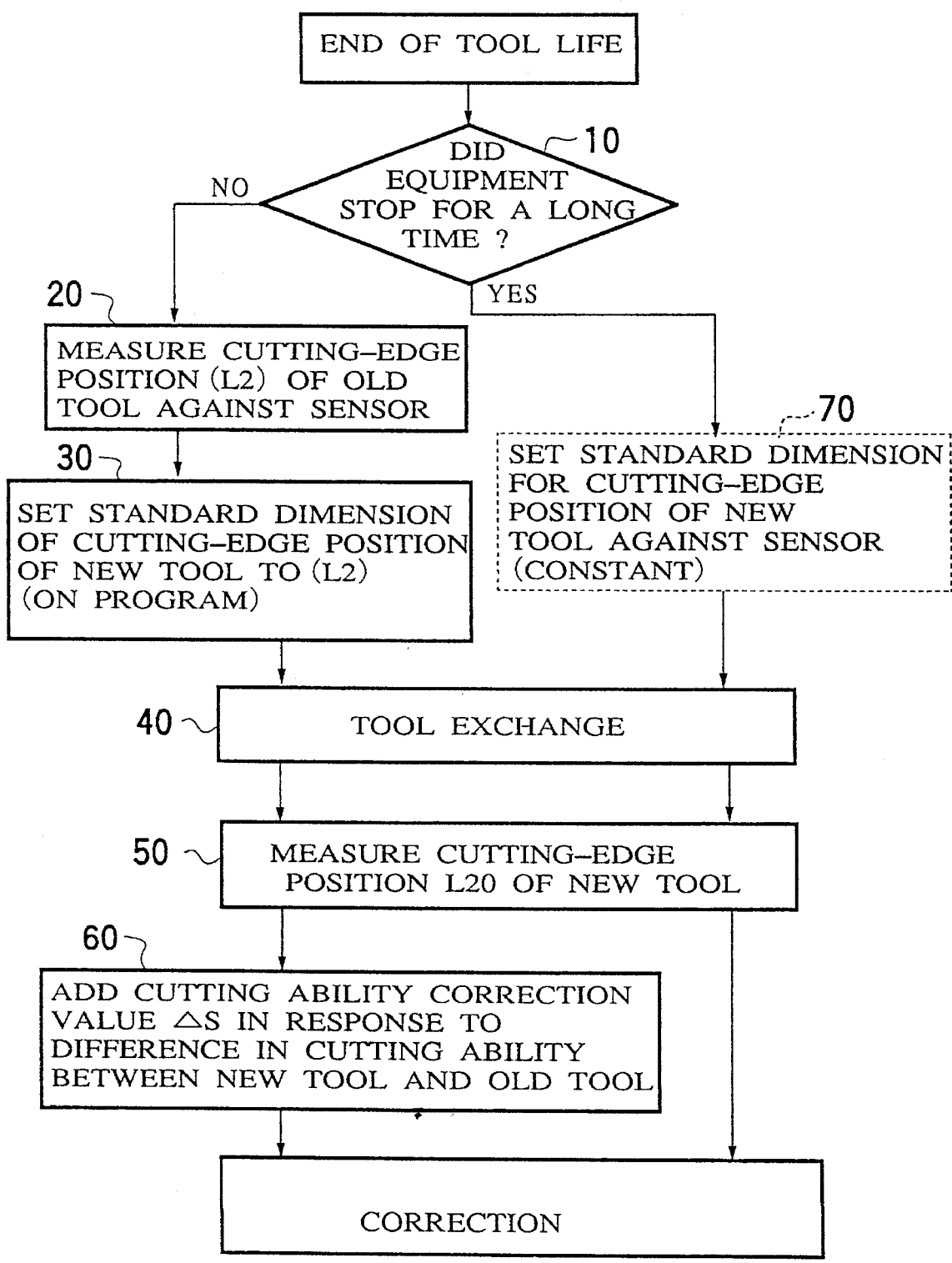
FIG. 9 is a flow chart for executing an operation of the device in accordance with an embodiment of the present invention.

The operation in accordance with the embodiment is now described with reference to flow-charts of FIGS. 9 and 10. In FIG. 9, first of all, when the old tool accomplishes the span of life so that to exchange the tool is required, the routine goes to step 10 where it is judged whether the rest period of the equipment is so long as to exceed a predetermined time by the measuring section 35. If the period is not so long, the routine goes to step 20 where the position L2 of the cutting-edge of the old tool T1 with respect to the cutting-edge detecting sensor S2 is detected as the movement amount of the tool table 200, to which a correction value of the position of cutting-edge memorized at that time is also taken into consideration. Sequentially at step 30, it is executed to memorize the obtained movement amount L2 in the abnormal position correcting means 37, as the abnormal standard dimension L2 in the basic processing program (see the position (a) of FIG. 3). At step 40, to mount the new tool T2 in exchange for the old tool T1 is executed and then the routine goes to step 50. At step 50, the position L20 of the cutting-edge of the new tool T2 with respect to the cutting-edge detecting sensor S2 is measured as the movement amount of the tool table 200, to which a correction value of the position of the cutting-edge memorized at that time is also taken into consideration (see the position (b) of FIG. 3) and sequentially, the calculated difference between the standard dimension L2 and the position L20 of cutting-edge of the new tool T2 is stored in the abnormal position correcting means 37 as the correction value ΔT for the cutting-edge position of the new tool. In correction, the correction value ΔT is operated in the CPU 31, so that the new tool T2 is shifted so that the cutting-edge thereof occupy the position shown in (c) of FIG. 3. Next, at step 60, it is executed to add the cutting ability correction value ΔS, which is derived from the difference in cutting ability between the new tool T2 and the old tool T1, into the correction value ΔT.

As mentioned before, the cutting ability correction value ΔS is stored in the cutting ability adjusting means 38. Note that the value ΔS is a constant corresponding to a dimensional change which can be obtained from the relationship between various wear amounts of the cutting-edge and the dimensional changes by the preceding experiments. Then, this cutting ability correction value ΔS is loaded into the CPU 31 at the time of correcting the cutting-edge of the new tool T2 and then operated therein for calculation. Consequently, the cutting-edge of the new tool T2 is adjusted so as to occupy the position shown in (d) of FIG. 3. In this way, the process to correct the abnormal position of the cutting-edge of the new tool when exchanging the tool in the abnormal condition is completed.

Figure 10:
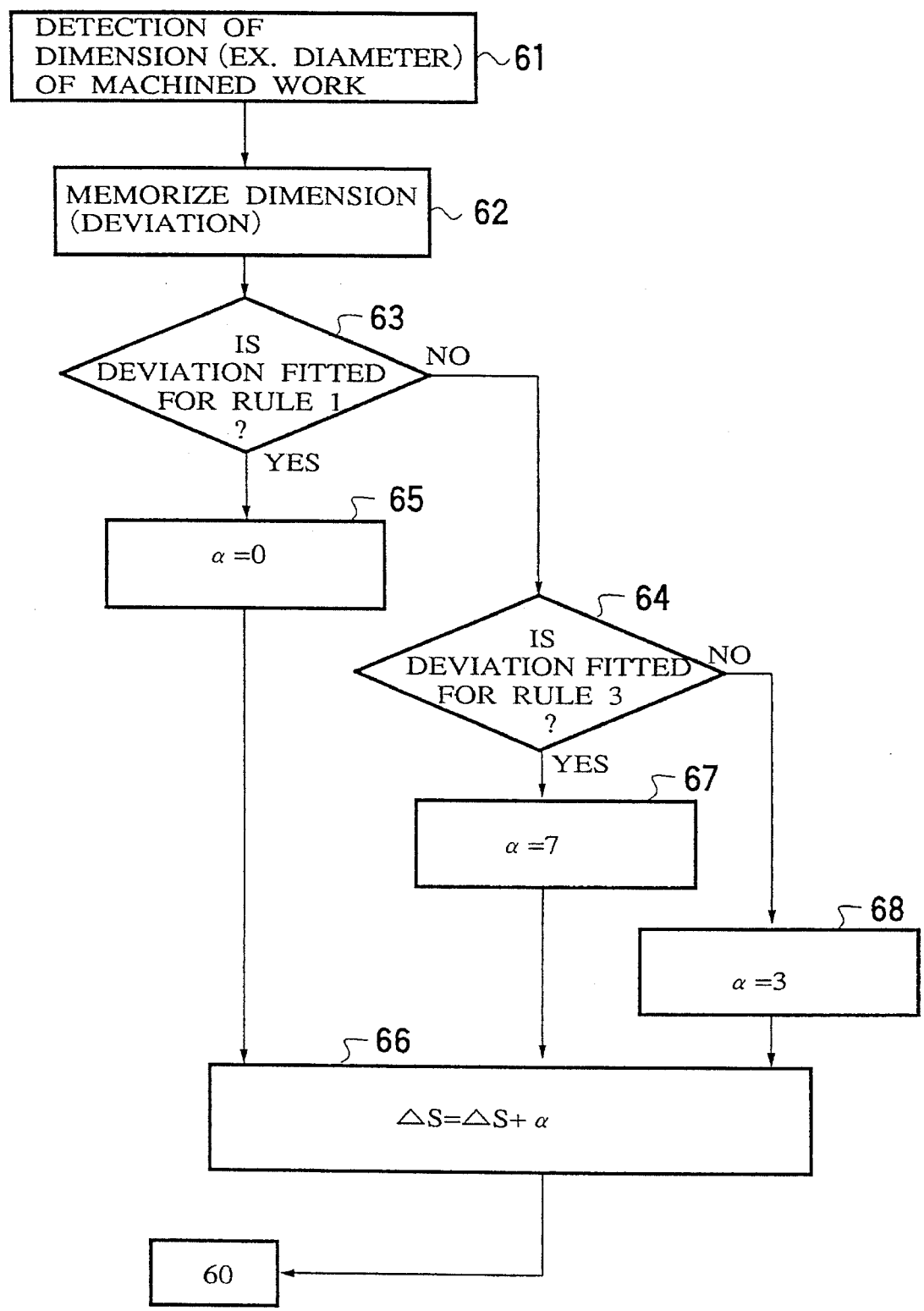
FIG. 10 is a flow chart for correcting the cutting ability correction value of FIG. 9.

In order to correct the correction values in either of the case of changing the kind of work or the other case where the wear amount of the cutting-edge is not a constant value, the cutting ability correction value ΔS is amended in accordance with the flow chart shown in FIG. 10.

At step 61, the dimension of work machined initially by the new tool just after change is detected at every exchange and the routine goes to step 62. Then, at step 62, the dimensional data obtained in step 61 is stored in the cutting ability adjusting means 38 as the deviation from the midpoint of tolerance (cf. FIG. 6). At sequent step 63, it is judged whether the detected deviation is suitable for Rule 1 of the Rule established in advance (cf. FIG. 7). If the judgement at step 63 is Yes, i.e., the deviation is fitted for Rule 1, then the routine goes to step 65 where the compensating amount $\alpha$ is set to zero. Consequently, the cutting ability correction value $\Delta S$ becomes equal to zero at step 66.

On the contrary, if the judgement at step 63 is No, the routine goes to step 64 where it is judged whether the deviation is suitable to Rule 3. When the judgement at step 64 is Yes, then the routine goes to step 67 where the compensating amount $\alpha$ is set to 7μ and sequentially, the cutting ability correction value $\Delta S$ is amended to the value $\Delta S+7\mu$ at step 66. Conversely, if the judgement at step 64 is No, then the routine goes to step 68 where the compensating amount $\alpha$ is set to 3μ and sequentially, the cutting ability correction value $\Delta S$ is amended to the value $\Delta S+3\mu$ at step 66. The so-amended cutting ability correction value $\Delta S$ is applied to the cutting ability correction value $\Delta S$ in step 60 of FIG. 9, which is always loaded to the CPU 31 during operation of the lathe, whereby the position of the cutting-edge of the tool is corrected.

Returning to FIG. 9, if the judgement at step 10 is Yes, i.e., in case that the rest period of equipment is so long, the routine goes to step 70 where it is executed to establish the measuring standard dimension of the new tool T2 with respect to the cutting-edge detecting sensor S1 as a constant. In such a case, after exchanging the tool at step 40, the routine goes to step 50 where the movement amount of the tool table 200 necessary to bring the cutting-edge of the new tool T2 into contact with the cutting-edge detecting sensor S2 is measured and then the difference between the standard dimension and the movement of the tool table 200 is stored in the normal position correcting means 36 as the normal position correction value for the cutting-edge of the new tool. Next, at the time of exchanging the tool, the stored normal position correction value is loaded and processed in the CPU 31, whereby the cutting-edge position of the new tool can be corrected.

According to the embodiment, by detecting the rest period of the equipment by the measuring section 35, it is judged whether the main spindle table 101 at the time of exchanging the tool is in the normal condition or not. Further, the cutting-edge position of the tool is corrected by using different measuring standard dimensions which are prepared for the normal and abnormal conditions respectively.

According to the embodiment, assuming that the tool in use performs a machining with proper dimensions, since the cutting-edge position of the old tool at the end of its use, which is detected by the "thermally" displaced cutting-edge detecting sensor S2, is employed as the abnormal standard dimension, it is possible to eliminate measuring errors derived from the thermal displacement of the cutting-edge detecting sensor. In addition, since the correction in the abnormal condition is performed by a combination of the cutting ability correction value $\Delta S$, which originates in the difference in cutting ability between the old tool completing its span of life and the new tool, into the basic processing program, it is usually possible to perform the machining with proper dimensions.

Furthermore, according to the embodiment, since the cutting ability correction value is always corrected during operation of the equipment by the "tendency variation" feed back control carried out by monitoring either the dimension of work on machining or the cutting force exerted on the tool, it is possible to attain the machining with proper dimensions usually even when the work to be machined is changed or the wear amount of cutting-edge is not a constant value. Further, since the obtained cutting-edge position correction value is used in exchanging the tool, it is possible to prevent the initial work after exchanging the tool from being dimensionally rejected, so that the unmanned equipment and improvement in availability factor of the equipment can be realized.

Finally, it will be understood by those skilled in the art that the foregoing description of the preferred embodiments of the disclosed structure, and that various changes and modifications may be made to the present invention without departing from the spirit and scope thereof.

What is claimed is:

1. A method of correcting a cutting-edge position of a tool installed in a numerically controlled machine having a bed, a main spindle table fixed on the bed, a main spindle rotatably supported by the main spindle table for carrying a work to be machined, a tool table movably mounted on the bed, a tool for machining the work and a cutting-edge detecting sensor mounted on either the main spindle table or the bed for detecting a position of a cutting-edge of the tool, said numerically controlled machine tool being operated in accordance with a basic processing program into which a difference between a movement amount of the tool table and a predetermined standard dimension is provided as a cutting-edge position correction value, the movement amount of the tool table being at a distance necessary to bring the cutting-edge of the tool into contact with the cutting-edge detecting sensor, the method comprising the steps of:

judging whether a temperature of the main spindle table is in a normal condition or an abnormal condition when exchanging an old tool for a new tool;

in the normal condition,
regarding the movement amount of the tool table as a normal movement amount of the tool table having the new tool; and
providing a difference between the normal movement amount and the predetermined standard dimension into the basic processing program, as the cutting-edge position correction value for the new tool; or in the abnormal condition,
regarding the movement amount of the tool table as an abnormal movement amount of the tool table having the old tool;
replacing the predetermined standard dimension with the abnormal movement amount as a newly determined standard dimension;
establishing a difference between the newly determined standard dimension and a position of a cutting-edge of the new tool as the cutting-edge position correction value for the new tool;
regarding a machined dimensional change, which can be obtained from a relationship thereof with wear amount of cutting-edge by preceding experiments, as a cutting ability correction value of the new tool; and
providing the cutting-edge position correction value for the new tool and the cutting ability correction value thereof into the basic processing program.

2. A method of correcting a position of the cutting-edge of a tool installed in a numerically controlled machine, as claimed in claim 1, wherein the judgement whether the temperature of the main spindle table is in the normal condition or the abnormal condition is attained by judging whether or not a rest period of the machine is within a predetermined time.

3. A method of correcting a position of the cutting-edge of a tool installed in a numerically controlled machine, as claimed in claim 2, wherein, during operation of the machine tool, the cutting ability correction value is always corrected by a feed back control carried out by monitoring either a dimension of the work on machining or a cutting force exerted on the tool.

4. A device for correcting a position of cutting-edge of a tool installed in a numerically controlled machine having a bed, a main spindle table fixed on the bed, a main spindle rotatably supported by the main spindle table for carrying a work to be machined, a tool table movably mounted on the bed, a tool for machining the work and a cutting-edge detecting sensor mounted on either the main spindle table or the bed for detecting a position of a cutting-edge of the tool, said numerically controlled machine tool being operated in accordance with a basic processing program into which a difference between a movement amount of the tool table and a predetermined standard dimension is provided as a cutting-edge position correction value, the movement amount of the tool table being at a distance necessary to bring the cutting-edge of the tool into contact with the cutting-edge detecting sensor, the device comprising:

a central processing unit which operates the basic processing program, taking the cutting-edge position correction value thereinto;

judging means for judging whether a temperature of the main spindle table is in a normal condition or abnormal condition when exchanging an old tool for a new tool;

normal position correcting means for detecting the movement amount of tool table necessary to bring the cutting-edge of the new tool into contact with the cutting-edge detecting sensor, the normal position correcting means memorizing a difference between the movement amount of the tool table and the predetermined standard dimension as a normal cutting-edge position correction value for the new tool;

abnormal position correcting means for detecting the movement amount of tool table necessary to bring the cutting-edge of the old tool into contact with the cutting-edge detecting sensor, the abnormal position correcting means memorizing a difference between the movement amount of the tool table and the predetermined standard dimension as an abnormal cutting-edge position correction value for the old tool; and cutting ability adjusting means for memorizing a dimensional change of the work machined as the cutting ability correction value of the new tool in the abnormal condition, the dimensional change being obtained from a relationship thereof with wear amount of cutting-edge by preceding experiments.

5. A device for correcting a position of cutting-edge of a tool installed in a numerically controlled machine, as claimed in claim 4, wherein the judging means judges whether or not a rest period of the machine in case of exchanging the new tool for the old tool is within a predetermined time.

\* \* \* \* \*